United States Patent [19]

Wrede

[11] 4,431,533
[45] Feb. 14, 1984

[54] FILTER FOR LIQUIDS, PARTICULARLY FOR PURIFYING DRINKING WATER

[75] Inventor: Franz J. Wrede, Werl, Fed. Rep. of Germany

[73] Assignee: Standard Messgerätefabrik GmbH, Fed. Rep. of Germany

[21] Appl. No.: 347,330

[22] Filed: Feb. 9, 1982

[30] Foreign Application Priority Data

Feb. 17, 1981 [DE] Fed. Rep. of Germany ....... 3105677

[51] Int. Cl.³ .............................................. B01D 35/02
[52] U.S. Cl. ...................................... 210/87; 210/418; 210/448
[58] Field of Search ................... 210/85, 87, 443, 446, 210/448, 449, 130, 131, 418

[56] References Cited

U.S. PATENT DOCUMENTS 3,869,382  3/1975  Tejeda ................................... 210/85
4,166,792  9/1979  Offer .................................... 210/446
4,212,743  7/1980  Meter et al. .......................... 210/443

Primary Examiner—John Adee
Attorney, Agent, or Firm—McGlew and Tuttle

[57] ABSTRACT

A filter for liquids, particularly drinking water comprises a housing with an inlet connected in the housing and an outlet connected out of the housing with a filter chamber in the housing having a filter material therein. The filter chamber has a connection to the inlet and to the outlet and in addition there is a direct passage which has a connection to both the inlet and the outlet. A settable control is associated with the housing and in one position it permits flow through the filter chamber and then to the outlet and in another position it permits direct flow from the inlet of the housing to the direct passage to the outlet. The settable control is associated with an indicator which is set with the control for the flow through the filter to provide an indication such as an optical or a sonic indication. In one embodiment of the invention the indicator comprises a battery operated light and the construction is such that the battery will wear out to cause the light to go out at a time comparable to the ordinary use time for the filtering material which may, for example comprise charcoal.

9 Claims, 4 Drawing Figures

FILTER FOR LIQUIDS, PARTICULARLY FOR PURIFYING DRINKING WATER

FIELD AND BACKGROUND OF THE INVENTION

This invention relates in general to filters and in particular to a new and useful water filter particularly for drinking water which includes an indicator when the water is passed through a filtering material which will last for a time which compares to the assumed use life of the filtering material.

Water filters for drinking water supply systems are known. Substantially, they serve the purpose of dechlorinating and sterilizing drinking water, wherefore they contain a suitable filtering substance, such as charcoal. However, prior art filter designs have the disadvantage of not admitting of any recognition as to whether or not the filter is already saturated with noxious substances. Consequently, it cannot be excluded that filters will be in use which are already exhausted and the dechlorination and sterilization of the drinking water will no longer be satisfactory. The invention provides a remedy in this respect.

SUMMARY OF THE INVENTION

The invention is directed to a filter of the above-mentioned kind permitting to check the efficiency of the filtering insert and being relatively simple in design and reliable in operation.

In accordance with the invention water is directed through an inlet of a filter housing and may either flow directly to an outlet or be diverted into a filter chamber for flow through a filtering material. A control is effected for switching from the filter chamber to a direct flow and when the control is set to the filter chamber it actuates an indicator such as a light bulb to indicate that the filter is being used and further to provide for an indication of the useful life of a filtering material. For this purpose the indicator advantageously comprises a battery which is selected so that it will be completely discharged at a time comparable to the normal assumed use life of the filtering material.

The invention starts from the experience that an electrical energy storage means for an optical or acoustical indicator can be dimensioned to have a time of discharge corresponding to a definite amount of water which has passed through the filter, for example an amount of 1,000 liters. It must be ensured in addition that the indicator will be switched on only during a removal of water, so as to actually bring the discharge of the energy source into relation with the drawing of water. In consequence, the optical or acoustical indicator of the inventive water filter is automatically switched on only during the periods of time in which water flows through the filter insert and is being purified. As soon as no optical or acoustical signal is perceivable any longer, while the indicator is switched on, thus while water is drawn off, a state of saturation with noxious substances is assumed to have been reached and either the entire filter or the filtering insert must be changed. The inventive filter thus makes it possible to monitor the efficiency of the filtering insert in an easy and satisfactory way. The means for this purpose are relatively simple in construction and operation. These are the substantial advantages of the invention.

Accordingly, it is an object of the invention to provide a filtering device, particularly for drinking water which includes an indication showing that the water is being passed through a filtering material which indication will last generally as long as the normal known use life of the filtering material.

In the preferred form, the invention includes a housing with a direct flow passage therethrough from an inlet to an outlet with a control member in the flow path which may be set to regulate the flow so that it will flow to a filtering chamber with filter through filtering material such as charcoal before it exits through the outlet. The housing includes an adjustable portion which may be shifted so as to effect the change of the flow from the direct flow passage to the filter chamber or vice versa and it is connected to an indicator device such as an electric lamp which will be lit when the device is operating to pass the flow through the filter. Advantageously a battery is selected for the lamp circuit which will last as long as the normal assumed or known use life of the filtering material so that the indicator will go out at a time when the filtering material should be changed or renewed.

The construction advantageously includes a housing which has a bottom part which is threaded or otherwise adjustable in respect to a top part so as to effect the changeover from the direct flow to the filter chamber flow and to effect the indication. The movement of the housing changes both the flow passage as well as the switches on the indicator. The filtering insert is received in an annular space formed between the tubular flow channel which provides a direct flow and the surrounding chamber which forms a filter chamber. A mere adjustment of height of the portion of the housing moves the control sleeve into its free flow or filtering position selectively and effects both the fluid flow change as well as the indication change. The control device for the flow change advantageously comprises a piston or similar element which is slidable in the direct flow chamber and may be oriented to block flow into the filter chamber and permit flow in the direct chamber or vice versa.

Accordingly it is an object of the invention to provide a filtering device for drinking water which includes an arrangement wherein the flow may be diverted from the direct flow through the device to flow through a filtering chamber and filtering material and which has an indicator which will be set when the flow is through the filtering material and will last substantially as long as the filtering material is useful.

A further object of the invention is to provide a filter which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention is illustrated.

IN THE DRAWINGS

DESCRIPTION OF THE PREFERRED EMBODIMENTS

Figure 1:
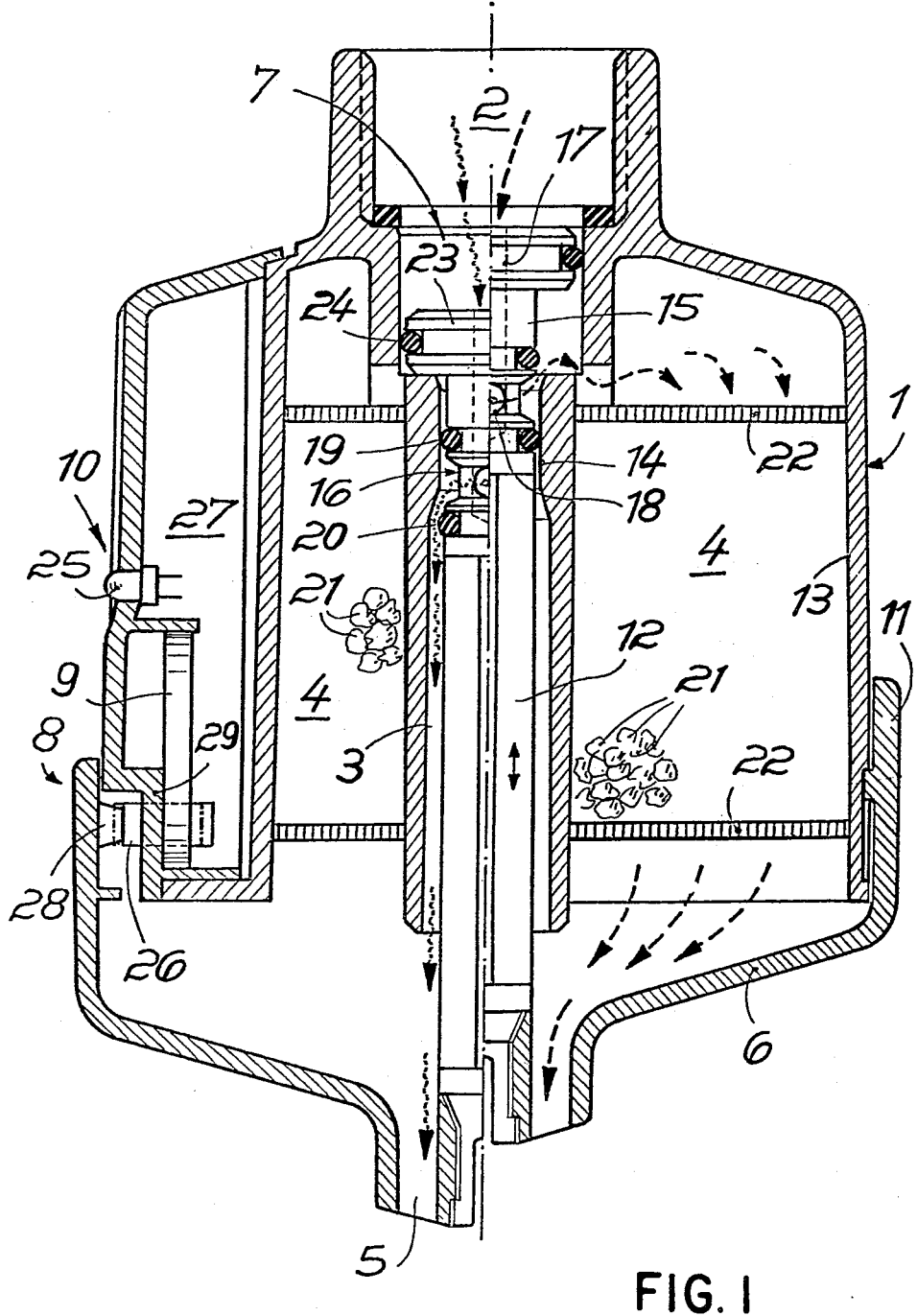
FIG. 1 is an axial sectional view of a water filter constructed in accordance with the invention.
Figure 3:
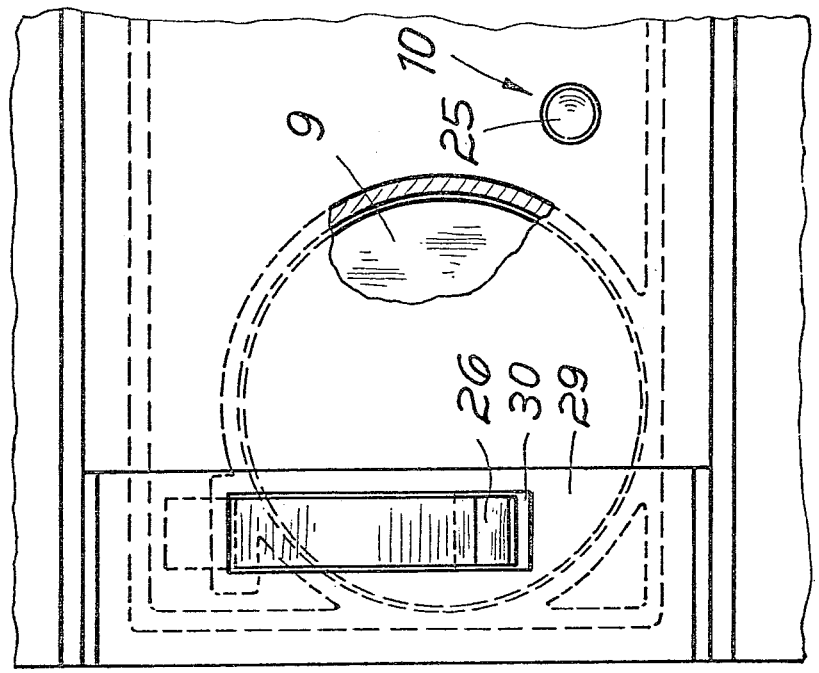
FIG. 3 is a section taken along the line A—A of FIG. 2.
Figure 2:
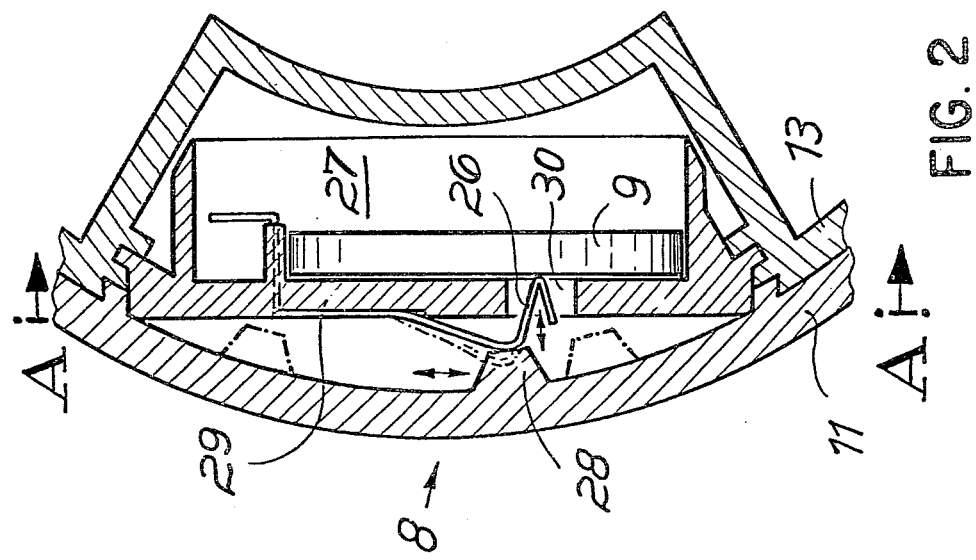
FIG. 2 is an enlarged partial horizontal sectional view of a device shown in FIG. 1.

Referring to the drawings in particular the invention embodied therein in FIGS. 1 to 3, comprises a filter for liquids particularly drinking water which comprises a housing generally designated 1 having a water inlet 2 connected into the housing and an outlet 5 extending outwardly from the housing. A filter chamber having a filter insert 4 therein is provided in the housing and there is a connection from the filter chamber to the inlet 2 and to the outlet 5. Direct passage for flow channel 3 is defined from the inlet directly to the outlet 5. Settable control means including a setting member 12 disposed in the flow channel 3 and a bottom part 6 of the housing 1 are associated with the direct passage in the inlet passage and are settable for selectively permitting flow from the inlet through the filter passage to the outlet and from the inlet through the direct passage from the outlet. Indicator means are associated with the control means and includes in the embodiment shown an actuating device 8 connected to the settable control means and set so as to show that when the filter passage is being used by lighting an indicator such as a lamp 25 of an optical or acoustical indicator generally designated 10. The indicator means 10 includes an electrical supply in the form of an expendable battery 9 which is chosen to have a life which is comparable to the useful operational life of the filter material which in this case is charcoal 21.

The figures show a filter for liquids, more particularly a filter for purifying drinking water. The filter substantially comprises a filter housing 1 provided with a water inlet 2, a central flow channel 3, a filter insert 4 surrounding the flow channel, and a bottom part 6 of the housing which is provided with a water outlet 5 common for both the flow channels 3 and the filtering insert 4. A control device 7 is deviating the water flow to the filtering insert 4 is provided in flow channel 3. An actuating device 8 operates on the control device 7 to move it from a free-flow position into a filtering position or vice versa. With control device 7 moved by actuating device 8 into its filtering position, device 8 switches on an optical or acoustical indicator 10 which is supplied from an electrical energy storage means 9. The amount of stored energy corresponds to a predetermined amount of water to be filtered by a single filtering insert. If, due to a consumption of the stored energy, no perceptible indication is given any longer by indicator 10 switched on, a saturation with noxious substances of filtering insert is assumed to have been reached and the water filter or filtering insert 4 must be changed.

The actuating device 8 comprises the vertically adjustable bottom part 6 including a guide sleeve portion 11 embracing filter housing 1, and a setting member 12 which is connected to bottom part 6 and extends coaxially into tubular flow channel 3 to operate on the control device 7 which is disposed at the upper end of the tube embodying channel 3. The position of bottom part 6 in height may easily be adjusted by providing a bayonet-type or inclined-plane guide between a housing 13 and guide sleeve 11.

Setting member 12 may be designed as a rod with a cylindrical or cross-shape section, in any case its cross-sectional area is smaller than that of the tubular flow channel so that water passage is not obstructed by member 12. Control device 7 comprises a control sleeve 15 which is connected to setting member 12 and guided in a narrowed portion 14 of tubular flow channel 3, and is provided with a circular neck groove 16, an axial blind bore 17, and a radial cross bore 18, and carries at least one upper and one lower sealing ring 19, 20 by which neck groove 16 is limited. The two sealing rings 19, 20 are spaced from each other to an extent that with the upper sealing ring occupying a position within the narrowed tubular portion 14, the lower sealing ring 20 leaves a clearance through which the water can flow from control sleeve 15 through cross bore 18, neck groove 16, and flow channel 3 directly to the outlet. However, with the lower sealing ring 20 occupying the position within narrowed tubular portion 14, upper sealing ring 19 leaves a clearance at the top of tubular flow channel 3, through which the water issuing from cross bore 18 and neck groove 16 is deviated to filter insert 4 provided in the annular space between tube 3 and housing wall 13, through which it then flows out. The first mentioned position of control sleeve 15 is its free-flow position, the second is its filtering position. The water flow is indicated in different lines for these two positions. The filtering insert 4 substantially comprises an upper and lower circular screens 22 between which filtering charcoal 21 is received. The upper end portion 23 of control sleeve 15 is guided in water inlet 2, by at least one further sealing ring 24.

The indicator 10, which is optical in the shown embodiment, comprises a diode or an incandescant lamp as a light source 25 which is dispersed in protected position in housing wall 13, a battery as the energy storage means 9, and a switch 26, and is accommodated in a peripheral chamber 27 of filter housing 1. In the upper position of actuating device 8, guide sleeve 11 actuates switch 26, while setting member 12 holds control sleeve 15 in the filtering position, since an adjustment in height of bottom part 6 at the same time correspondingly moves setting member 12 which is connected thereto. Guide sleeve 11 of part 6 operates through an actuating cam 28 on the switch which is designed as a spring element 26, associated with a contact element, and connected in the diode and battery circuit (only indicated). In the shown example, a bayonet-type guide is provided for the guide sleeve 11 adjustable in height, so that during this vertical motion, actuating cam 28 associated with the spring element describes a helical path and either actuates the spring element, or releases it so that the element automatically rebounds into its off position. Chamber 27 for accommodating indicator 10 is closed by a cover 29 on which the spring element 26 is mounted and which is provided with an aperture 30. Through this aperture 30, the spring element can be pressed against the contact element, or against the battery directly, to switch indicator 10 on.

Figure 4:
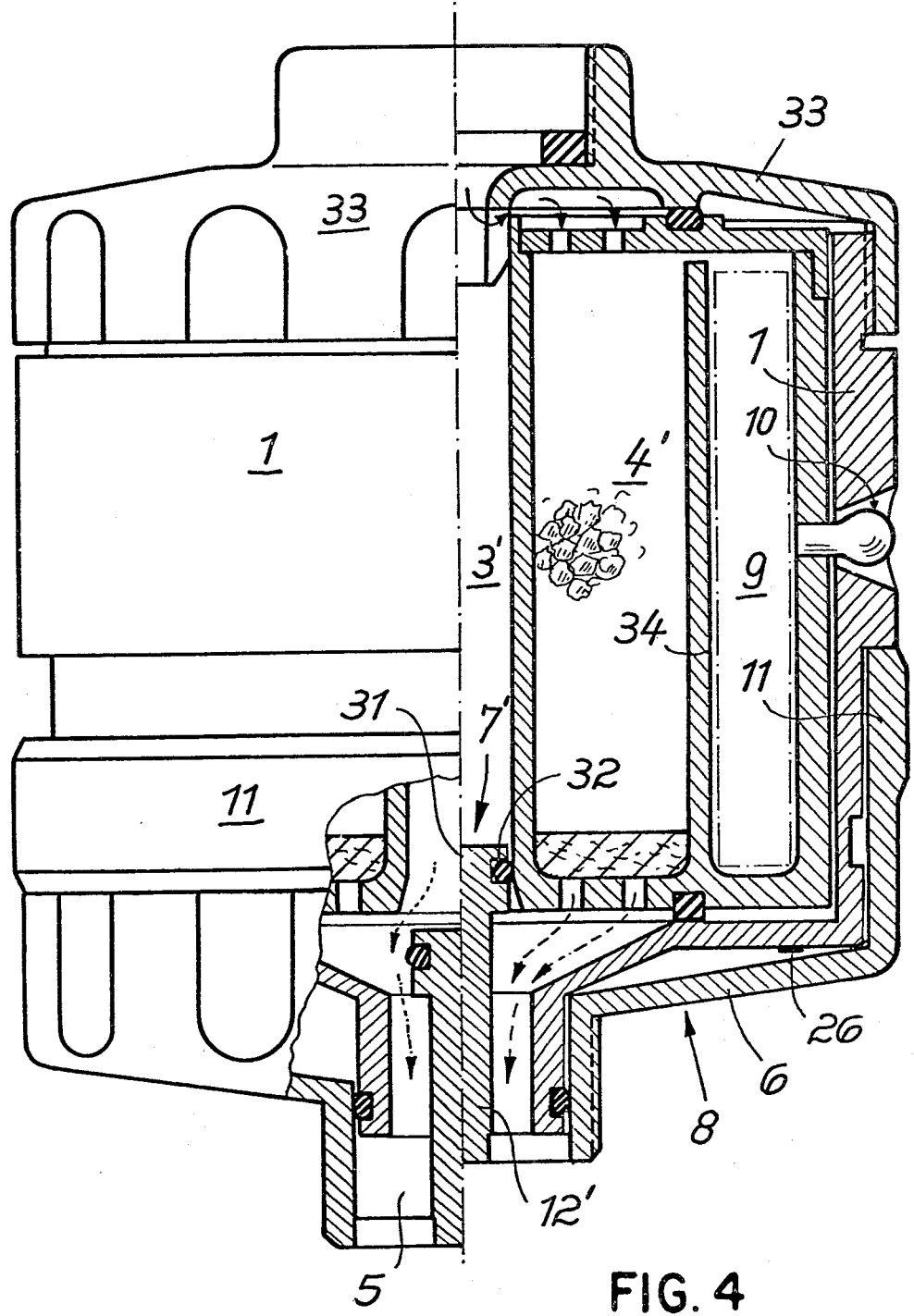
FIG. 4 is a view similar to FIG. 1 showing another embodiment of the invention.

In a modified embodiment of the invention as shown in FIG. 4, setting member 12', which is connected to the bottom part 6 is adjustable in height and forms a constructional unit with control device 7'. The control device 7' comprises a control piston 31 which is movable into and out of flow channel 3' and carries at least one circumferential sealing ring 32. With the control piston 31 moved out of channel 3', the inventive water filter is in its free-flow position. With control piston 31 moved into flow channel 3', the filter is in its filtering position. Filter housing 1 is provided with a removable cover 33 and a filter insert 4' is accommodated in the housing for exchange. In this embodiment, flow channel 3' is formed by the filter insert 4', and insert 4' is formed with a chamber 34 for the energy storage means 9 and the associated electronics.

While specific embodiments of the invention have been shown and described in detail to illustrate the application of the principles of the invention, it will be understood that the invention may be embodied otherwise without departing from such principles.

What is claimed is:

1. A filter for liquids, particularly drinking water, comprising:

a housing having an inlet, a central flow channel communicating with said inlet, and an outlet communicating with said channel, said housing defining a filter space around said channel and having an upper portion communicating with said channel, said space also communicating with said outlet;

a filter insert in said filter space and around said channel for filtering liquid passing from said upper portion of said space to said outlet;

a control device movable in operative association with said channel, from a free-flow position for allowing liquid to flow from said inlet through said channel to said outlet, and a filtering position for allowing liquid to flow from said inlet to said upper portion of said space, through said filter insert and to said outlet while bypassing said channel;

said housing including a top part with a guide sleeve and a bottom part movable with respect to said top part on said guide sleeve, said bottom part connected to said control device for moving said control device between its free flow and filtering position with movement of said bottom part;

an indicator connected to said housing and activatable to generate a perceivable indication;

electrical energy storage means for activating said indicator having an amount of storage energy for activating said indicator for a period of time corresponding to a predetermined amount of liquid flow through said filter insert; and switch means connected to said top and bottom parts of said housing, and connected between said electrical energy storage means and said indicator, for connecting said storage means to said indicator to activate said indicator when said bottom part is moved to move said control device into said filtering position where said electrical energy storage means is depleted of energy and can no longer activate said indicator upon the passage of the predetermined amount of liquid flow through said filter insert.

2. A filter for liquids, according to claim 1, wherein said control device comprises a control sleeve having a setting member portion guided in said channel and connected to said bottom part of said housing, said control sleeve having a passage therethrough for liquid from said inlet and having an opening, a first sealing ring on said control sleeve above said opening and a second sealing ring on said control sleeve below said opening, said channel shaped so that, with said bottom part moved to position said control device in said filtering position, said second sealing ring is engaged with said channel and said first sealing ring is disengaged with said channel to permit flow from said opening to said upper portion of said space, and with said bottom part moved to position said control device in said free flow position, said first sealing ring is engaged with said channel and said second sealing ring is disengaged with said channel to permit flow from said opening to said channel and block flow from said opening to said upper portion of said space.

3. A filter for liquids, according to claim 2, wherein said channel has a small diameter portion adjacent a point of communication between said channel and said upper portion of said space, and a large diameter portion below said small diameter portion, said first seal engaged with said small diameter portion when said control device is in its free-flow position and said second seal engaged with said small diameter portion when said control device is in said filtering position.

4. A filter for liquids, according to claim 3, wherein said channel includes an additional upper large diameter portion above said small diameter portion with a through passage between said additional large diameter portion and said small diameter portion communicating said channel with said upper portion of said space, said control sleeve including an upper large diameter portion with a third sealing ring engaged with said additional large diameter portion of said channel for sealing said inlet from said through passage in any position of said bottom part.

5. A filter for liquids, according to claim 1, wherein said indicator comprises an optical indicator for producing light when activated by said electrical energy storage means, said electrical energy storage means comprising a battery with an expected light substantially equal to said period of time.

6. A filter for liquids, according to claim 5, wherein said housing means includes means defining a peripheral chamber adjacent said filter space, said battery and indicator mounted in said peripheral chamber, said bottom part of said housing guided concentrically around and on said ground sleeve of said upper part of said housing, said switch means comprising a switch connected to said housing and communicating with said peripheral chamber, and a switch activator defined on an interior of said bottom part engeable with said switch when said bottom part is moved upwardly to move said control device to said filtering position.

7. A filter for liquids, according to claim 5, wherein said indicator comprises a light-emitting diode.

8. A filter for liquids, according to claim 1, wherein said control device is movable vertically with respect to said channel and comprises a control piston connected to said bottom part and movable into and out of said channel, said piston including at least one circumferential sealing ring therearound engageable with said channel to seal said channel with said control device in said filtering position.

9. A filter for liquids, according to claim 1, wherein said housing includes a removable cover for exposing said filter space and permitting removal of said filter insert.

* * * * *